US 6,429,877 B1

(12) United States Patent
Stroyan

(10) Patent No.: US 6,429,877 B1
(45) Date of Patent: Aug. 6, 2002

(54) SYSTEM AND METHOD FOR REDUCING THE EFFECTS OF ALIASING IN A COMPUTER GRAPHICS SYSTEM

(75) Inventor: Howard D Stroyan, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/365,115

(22) Filed: Jul. 30, 1999

(51) Int. Cl.[7] ................................................. G09G 5/36
(52) U.S. Cl. ..................... 345/611; 345/589; 345/431; 345/592; 345/613; 345/612; 345/614; 395/131
(58) Field of Search ................................. 345/136, 592, 345/431, 611, 612, 614, 589, 613, 469.1, 470; 395/131

(56) References Cited

U.S. PATENT DOCUMENTS

| 5,123,085 A | | 6/1992 | Wells et al. ................. 395/121 |
| 5,555,359 A | | 9/1996 | Choi et al. ................... 395/141 |
| 5,684,939 A | * | 11/1997 | Foran et al. ................. 395/131 |
| 5,742,277 A | | 4/1998 | Gossett et al. .............. 345/136 |
| 5,757,375 A | | 5/1998 | Kawase ....................... 345/429 |
| 5,812,139 A | | 9/1998 | Morimoto .................... 345/428 |
| 5,872,902 A | * | 2/1999 | Kuchkuda et al. ........... 395/130 |
| 6,175,372 B1 | * | 1/2001 | Ballard et al. ............... 345/470 |
| 6,201,545 B1 | * | 3/2001 | Wong et al. ................. 345/428 |

* cited by examiner

Primary Examiner—Richard Hjerpe
Assistant Examiner—Jean Lesperance

(57) ABSTRACT

The present invention is generally directed to a system and method for anti-aliasing edges of adjacent primitives. In accordance with one aspect of the invention, a method operates by determining whether a pixel is an edge pixel of a filled primitive, approximating a coverage area of the pixel, the coverage area being the area of the pixel interior to the primitive edge, determining a direction from the pixel center to an external edge of the primitive, and blending a first color of the primitive with a second color, the second color being a color of a pixel of a second primitive adjacent the external edge. In accordance with another aspect of the invention, a system is provided having frame buffer circuitry uniquely configured for rendering an anti-aliased graphics scene. In accordance with one embodiment, the frame buffer circuitry includes a first memory segment for storing color values associated with pixels, a second memory segment for storing alpha values associated with the pixels, a third memory segment for storing depth values associated with the pixels, and a fourth memory segment for storing anti-alias blending information associated with the pixels.

8 Claims, 7 Drawing Sheets

SYSTEM AND METHOD FOR REDUCING THE EFFECTS OF ALIASING IN A COMPUTER GRAPHICS SYSTEM

BACKGROUND OF THE INVENTION

1. Field of the Invention

The present invention relates to computer graphics systems and, more particularly to a system and method for reducing the effects of aliasing in a computer graphics system.

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer may define the primitive in terms of the X, Y and Z coordinates of its vertices, as well as in terms of the red, green, blue and alpha (R, G, B and $\alpha$) color values of each vertex. Alpha is a transparency value. Additional primitive data may be used in specific applications. Rendering hardware interpolates the primitive data to compute the display screen pixels that represent each primitive, and the R, G, B and $\alpha$ values for each pixel.

In the scan conversion process of a primitive or polygon, the polygon which is defined by the coordinates of its vertices, is converted to a raster image. The outline or edges of the polygon are first determined and the pixels between the polygon edges are then filled. The vertices of the polygon are translated into the display coordinate space and a line scan conversion algorithm is used, to determine the lines between vertices, which form the edges of the polygon. The line scan conversion algorithm computes the coordinates of the pixels, which lie closest to the line between vertices on a two-dimensional raster grid. However, the lines do not always coincide or "line up" with pixel locations. Although the closest pixel is chosen, the resulting line contains the undesirable alias effect. This undesirable effect also is carried into the polygon rendering process.

To better illustrate the phenomenon of aliasing and anti-aliasing correction (anti-aliasing), reference is made to FIGS. 1A through 1D. By way of a relatively simple illustration, FIG. 1A shows two cubes 10 and 12, which are leaned against one another. Specifically, cube 12 is leaned against cube 10 in a manner that partially obstructs the view of cube 10. Although not specifically illustrated in the drawing, further assume that the two cubes 10 and 12 have distinct and different colors. For example, cube 10 may be red, while cube 12 may be blue. The drawing of FIG. 1A shows crisp, straight lines for the edges of the cubes. However, and as should be understood, due to the problem of aliasing, the edges of the cubes (the edges where the cubes overlap) may become jagged.

To more particularly illustrate, reference is made to FIG. 1B, which illustrates that portion of FIG. 1A denoted by dashed line (reference numeral 14). In this regard, FIG. 1B shows a line 16, which is the true edge of cube 12. Surrounding this edge 16 are an array of pixels. Each pixel is represented with a center point, and an outer, circular rim. As illustrated, a number of pixels (illustrated in dashed line) have at least some portion that intersects the edge 16. These are also referred to as edge pixels. The remaining pixels will be assigned a solid color, corresponding to the color of the respective cube. In keeping with the previous example, pixels containing the letter B are assigned a blue color, while pixels containing the letter R are assigned a red color. With regard to the remaining pixels, if no anti-aliasing measures are employed, then the pixel colors are assigned to the color of the primitive containing the center point of the pixel. Under this approach, the pixels containing the letters BE (for blue edge) are also assigned the color blue, while pixels containing the letters RE (for red edge) are assigned a color red.

To better appreciate how this image may appear, reference is made to FIG. 1C, which illustrates the red pixels with black circles, and the blue pixels with white circles. It can be readily seen that the edge 16 is not crisply defined by the pixels, but rather a jagged edge, or appearance, results. When anti-aliasing measures are employed, however, the jagged appearance of this edge is smoothed over. This smoothing process is carried out by blending the color of adjacent pixels, in accordance to the relative proportion of the color within the pixel. For example, and again referring to FIG. 1B, pixel 18 is predominantly located within the red cube, having only a small portion located within the blue cube. Likewise, pixel 20 is located predominantly within the blue cube, having only a small portion located within the red cube. Pixel 22 is located substantially half-and-half between the red cube and the blue cube. With antialiasing measures employed, each of these edge pixels will be assigned some shade of purple or maroon (i.e., a blending of red and blue), depending upon the relative proportion of the colors within each pixel. Therefore, pixel 18 will be predominantly red, pixel 20 will be prominently blue, and pixel 22 will be a relatively even mix of red and blue. This blending operation is illustrated in black and white, by using shades of gray. As illustrated in FIG. 1D, pixel 18 is a slightly darker shade of gray than pixel 22, which in turn is slightly darker than pixel 20. Overall, this blending of colors serves to smoothing the appearance of the otherwise jagged edge between cubes 10 and 12.

Anti-aliasing methods are generally classified into a super-sampling method and an area sampling method. In the super-sampling method, the color value of a pixel is calculated by obtaining the color values of several sub-pixels within the pixel and averaging (or blending) the obtained color values of the sub-pixels. In area sampling, the area of the polygon occupying a pixel is calculated and then the color value of the area ratio is calculated. However this approach requires additional memory, and more extensive computations.

Other methods have also been proposed, which perform a blending of colors by computing a percentage of a given pixel covered by a first color, versus a second color (across a primitive edge).

OpenGL is known to provide a polygon anti-aliasing feature (called Polygon_Smooth). However, it requires a back to front (depth-wise) ordering of the primitives within the graphic scene to be rendered. This is often extremely difficult to ensure, and at the very least increases the complexity imposed upon the application designer.

Accordingly, it is desired to provide a system and method that provide an improved solution to effectively address the problem of aliasing in a computer graphics system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for anti-aliasing edges of adjacent primitives. In accordance with one aspect of the invention, a method operates by determining whether a pixel is an edge pixel of a filled primitive, approximating a coverage area of the pixel, the coverage area being the area of the pixel interior to the primitive edge, determining a direction from the pixel center to an external edge of the primitive, and blending a first color of the primitive with a second color, the second color being a color of a pixel of a second primitive adjacent the external edge.

In accordance with a related aspect of the invention, a method operates by evaluating a pixel to determine whether the pixel is on the edge of a filled primitive, determining a coverage area of the pixel, determining a direction from the pixel center to an external edge of the primitive, and blending a first color of the primitive with a second color, the second color being a color of a second primitive adjacent the pixel and in the determined direction.

In accordance with another aspect of the invention, a system is provided having frame buffer circuitry uniquely configured for rendering an anti-aliased graphics scene. In accordance with one embodiment, the frame buffer circuitry includes a first memory segment for storing color values associated with pixels, a second memory segment for storing alpha values associated with the pixels, a third memory segment for storing depth values associated with the pixels, and a fourth memory segment for storing anti-alias blending information associated with the pixels.

In a conventional rasterization process, only the pixels having centerpoints within a primitive are covered by the primitive, and therefore rendered (see FIG. 1C). However, and in accordance with present invention, the region of interest is effectively extended to pixels that touch the primitive edge in any amount. This allows the invention to represent minority coverage of a pixel by an appropriate blending by a coverage percentage.

One method of representing the primitive coverage of pixels with less than a 50% coverage value (e.g. the centerpoint is not covered) is to not modify the color buffer for this pixel, but rather only modify anti-alias (A/A) blend information to point toward the adjacent pixel having a centerpoint that is covered by the current primitive. This allows the minority contribution of this primitive to be considered while preserving original color value that represents the majority of this pixel's cover.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1A:
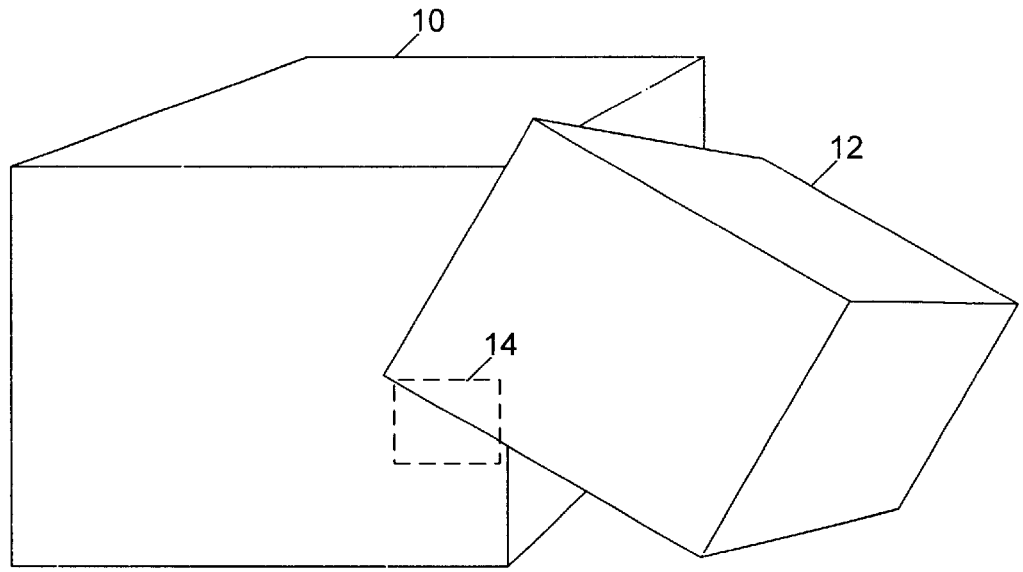
FIGS. 1A–1D are diagrams that illustrate the phenomenon of aliasing in a computer graphics scene.
Figure 1B:
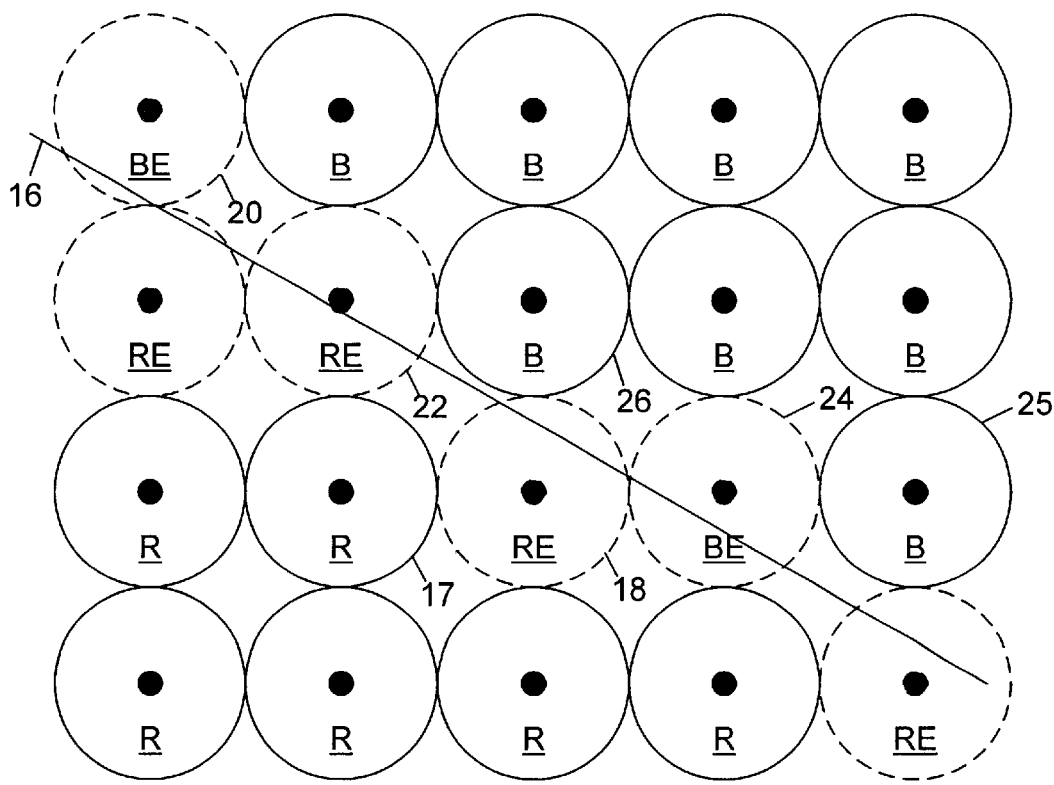
Figure 1C:
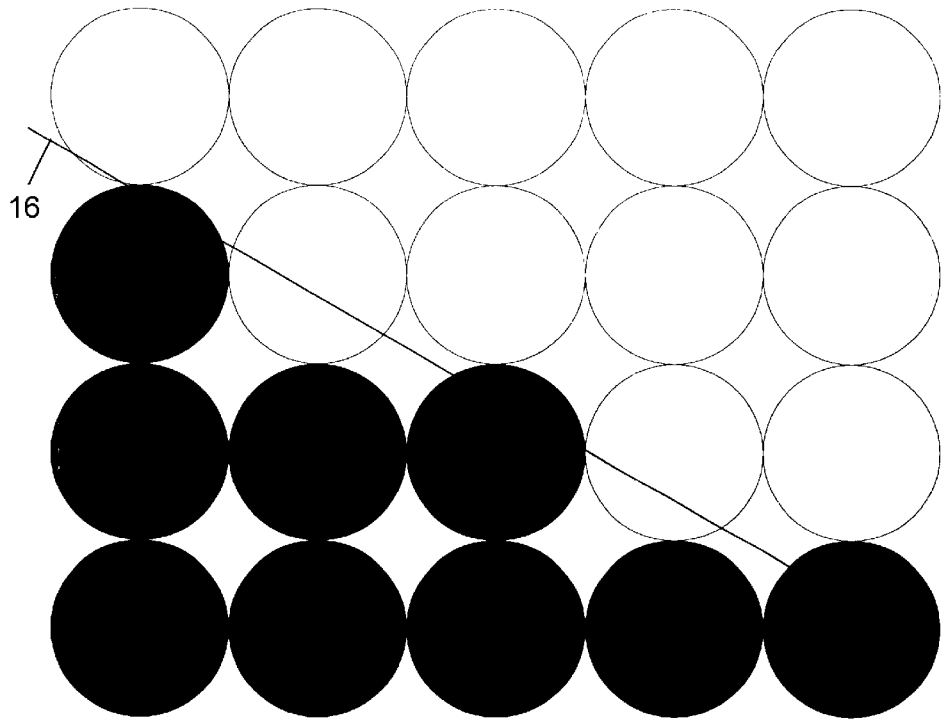
Figure 1D:
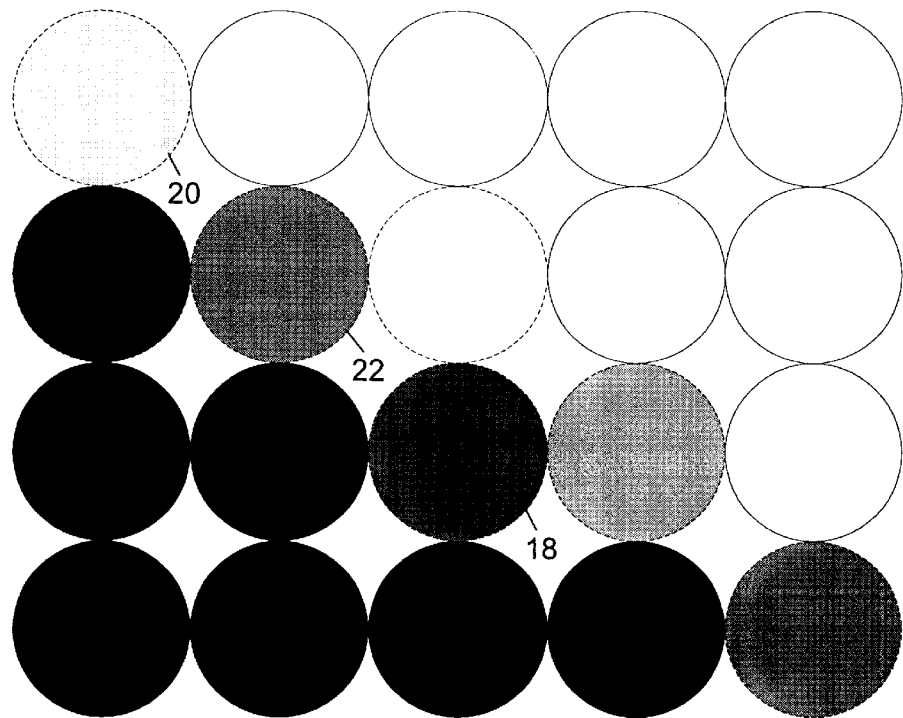

Having summarized the present invention above, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
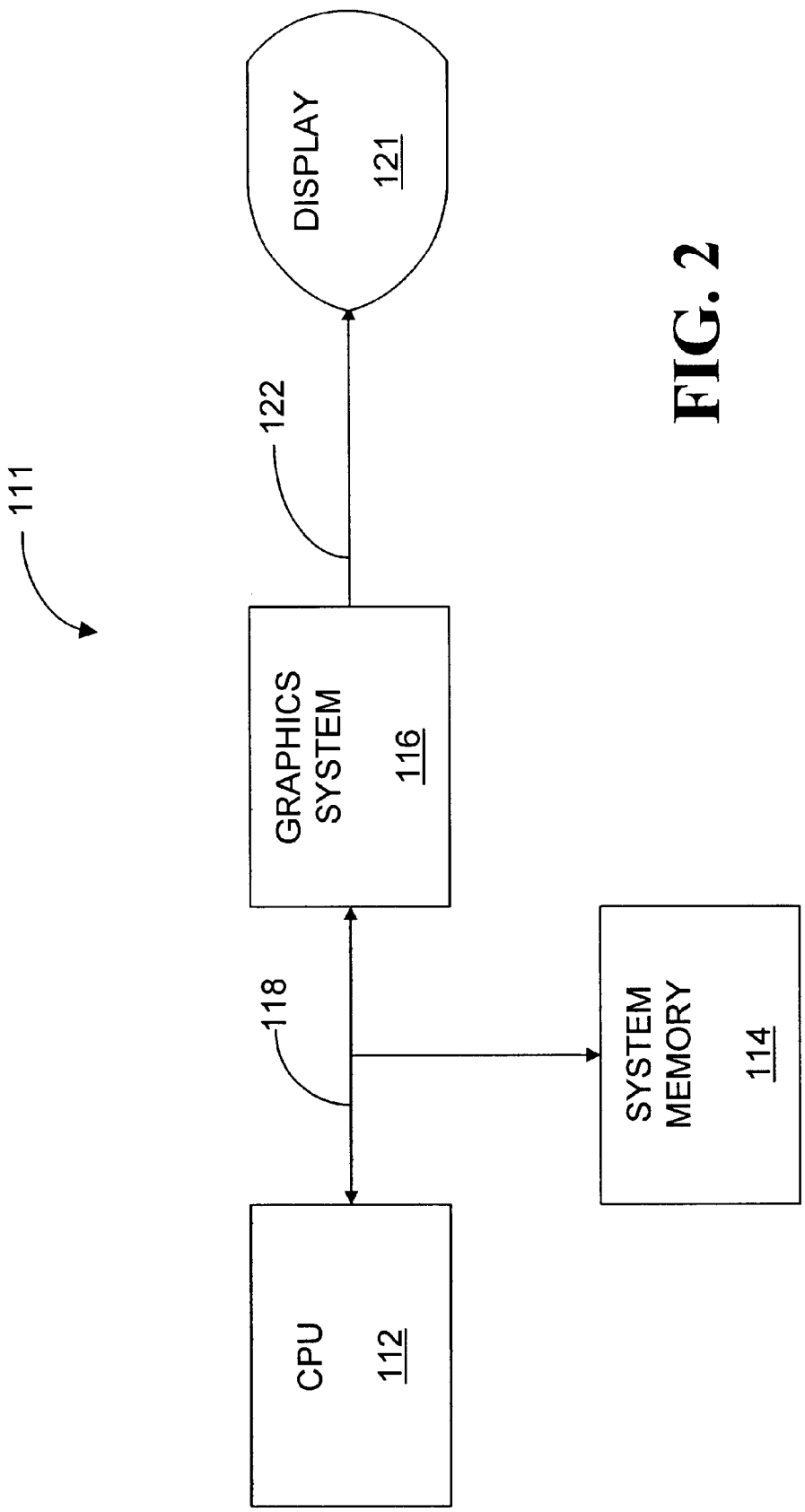
FIG. 2 illustrates a block diagram of a typical computer graphics system.
Figure 3:
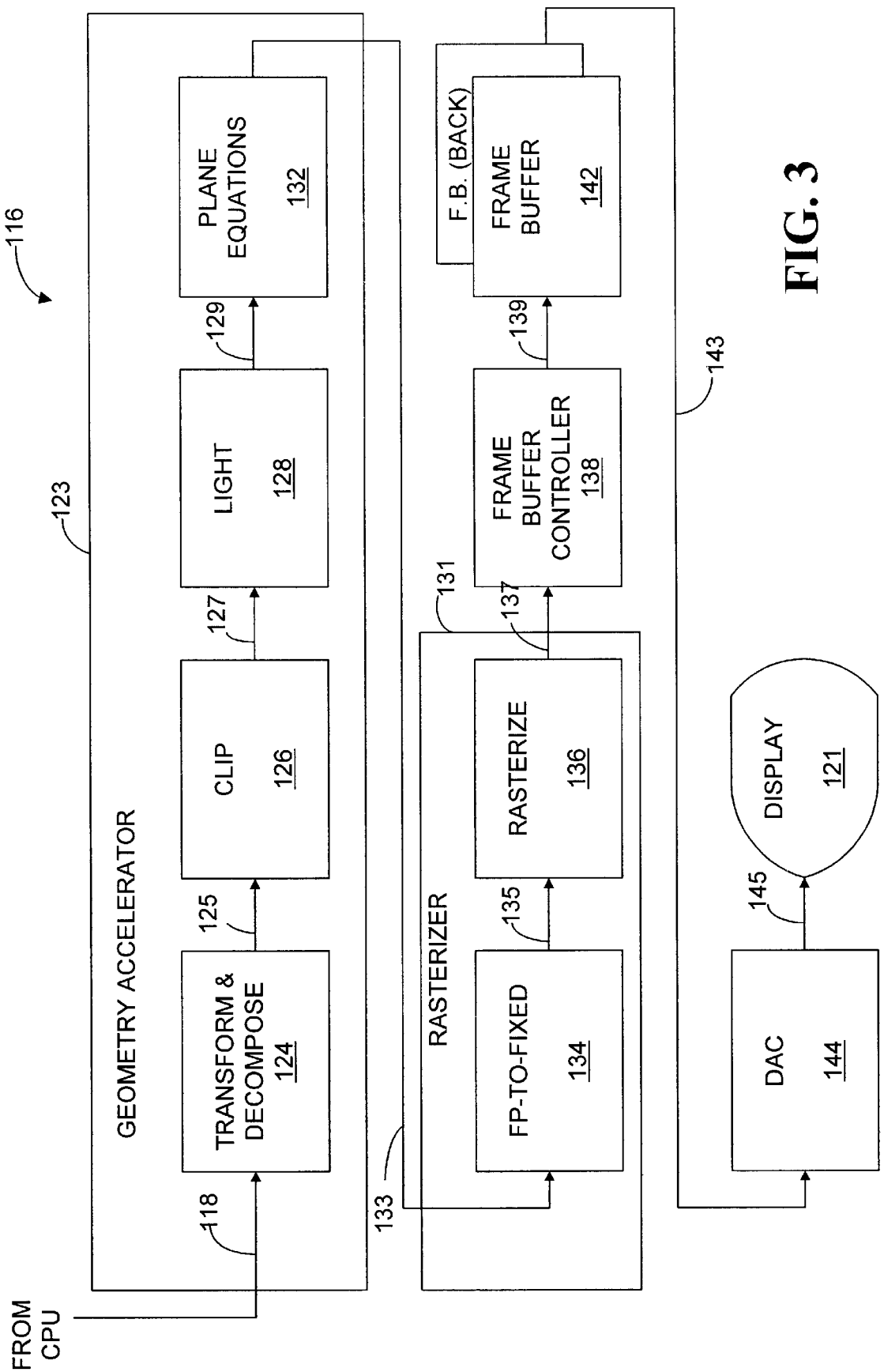
FIG. 3 illustrates a block diagram of a geometry accelerator and rasterizer of a computer graphics system.

Turning now to the drawings, reference is made to FIGS. 2 and 3, which illustrate the principal components in a conventional computer graphics system. The computer graphics display system 116 comprises a geometry accelerator 123, a rasterizer 131, a frame buffer controller 138, and a frame buffer 142. The computer graphics display system 116 may also include texture mapping hardware (not shown). The geometry accelerator 123 receives vertex data from the host CPU 112 that defines the primitives (e.g., triangles, polygons, etc.) that make up the image to be displayed on the display 121.

The geometry accelerator 123 typically includes a transform component 124, which receives vertex data from the CPU 112, a clipping component 126, an illumination or lighting component 128, and a plane equations component 132. The transform and decomposition component 124 performs transformations on the primitive vertex data received from the CPU 112, such as rotation and translation of the image space defined by vertex data. It also performs primitive decomposition, which decomposes multi-sided polygons into triangle (preferably) primitives, as triangle primitives are generally easier to work with than multi-sided polygons. It will be appreciated that, although the transform and decomposition block has been illustrated herein as a single functional block, the transform and decomposition functions may in fact be handled separately.

The clipping component 126 clips the vertex data so that only vertex data relating to primitives that make up the portion of the view that will be seen by the user is kept for further processing. Generally, all other vertex data is tossed or ignored. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The illumination component 128, hereinafter referred to as a lighting machine, calculates the final colors of the vertices of the primitives based on the both vertex data and on the locations of the light source(s) and the user relative to the object being displayed. The system CPU 112, through software, ultimately conveys the data for these parameters to the graphics accelerator 123 and its memory.

The plane equations component 132 generates floating point equations which define the image space within the vertices on the display screen. That is, the plane equations component 132 determines how to illuminate pixels between the vertices. The floating point equations are converted into fixed point equations by floating point to fixed point component 134 before being rasterized. The rasterizing component 136 of rasterizer 131 and the texture mapping hardware (not shown) generate the final screen coordinates and color data for each pixel in each primitive. The pixel data is stored in a frame buffer 142 for display on a video display screen 121.

The frame buffer 142 is a digital memory for storing the image to be displayed as a series of binary values. The monitor is comprised of a screen having an array of picture elements, known as pixels. Each pixel represents a dot on the screen and can be programmed to a particular color or intensity. Millions of individual pixels so programmed are used to represent a displayed image. It is these individual pixel values which are stored in the frame buffer. A display controller is an interface used for passing the contents of the frame buffer to the monitor. The display controller reads the data from the display buffer and converts it into a video signal. The video signal is fed to the monitor which displays the image.

Figure 4:
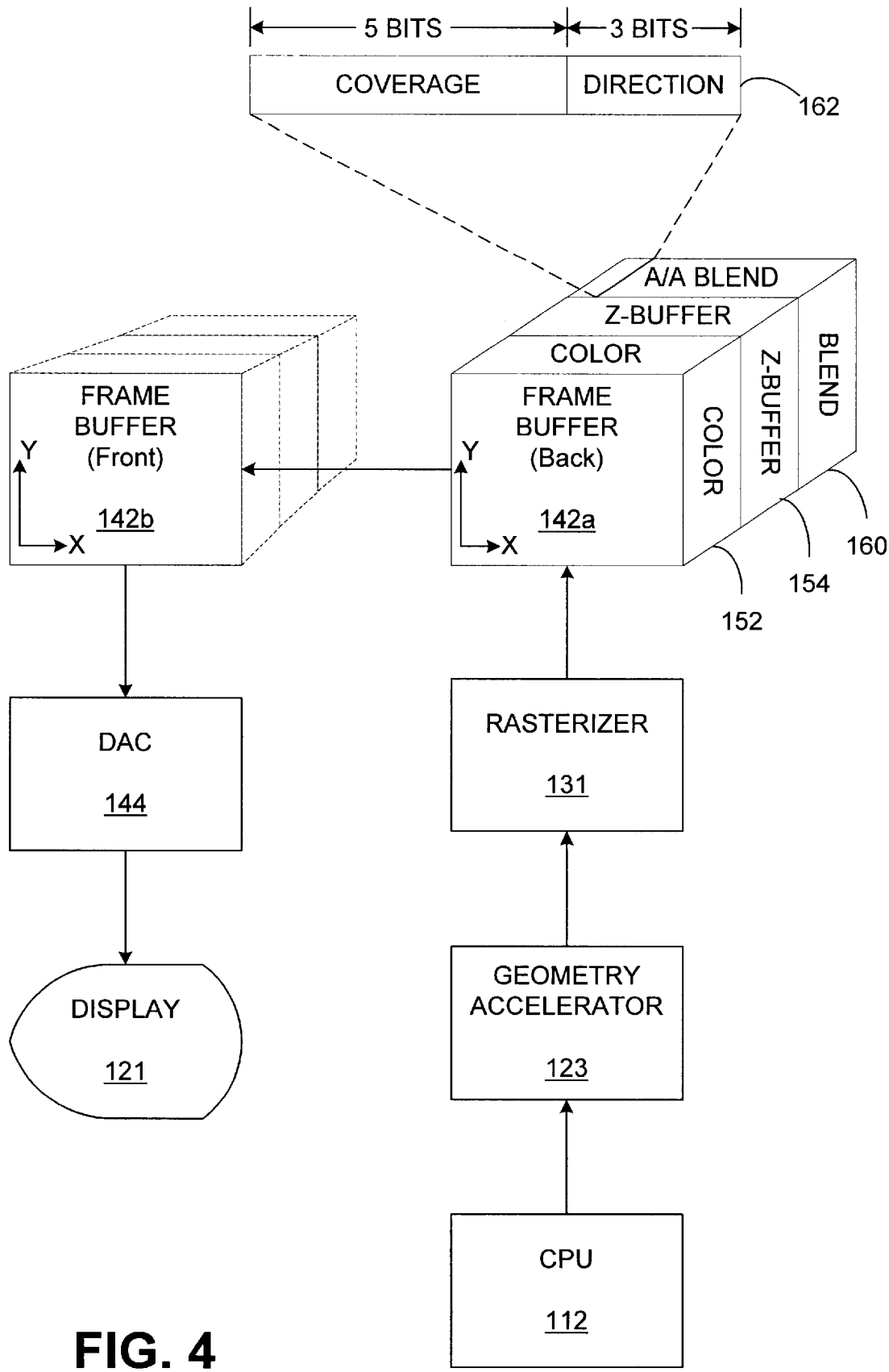
FIG. 4 illustrates a block diagram of frame buffer circuitry including additional memory for implementing one embodiment of the present invention.

Having described the general architecture of a typical computer graphics system, reference will now be made in more detail to that portion of the graphics system most pertinent to the present invention. In this regard, reference is made to FIG. 4, which is a block diagram illustrating more detail in regard to the frame buffer circuitry. As is known, after being rasterized, graphic data is stored in a frame buffer 142 before being converted by a digital to analog converter 144 and routed to a display. Typically, data sent to the frame buffer 142 is often "double buffered" between a "back" frame buffer 142a and a "front" frame buffer 142b. As data is rasterized by the rasterizer 131, it is written into the back frame buffer 142a. Once the back frame buffer is full of data, the data may be transferred to the front frame buffer 142b, and the digital to analog converter 144 reads data from the front frame buffer 142b. As is known, the transfer of data from the back frame buffer 142a to the front frame buffer 142b may be implemented simply by the use of a pointer, or other device, to denominate one of the two memory areas as a front frame buffer, and the other as a back frame buffer. In this way, data need not be physically transferred from one memory segment to another. Double buffering the frame buffer in this way provides a seamless visual presentation of data.

In this regard, and as is known, the digital to analog converter 144 constantly reads data from the front frame buffer 142b, and converts that data into an analog, video signal, which is input to a video display. The swapping of data between the front frame buffer 142b and the back frame buffer 142a is typically timed to occur during the vertical retrace cycle of the display. Again, this provides a seamless visual presentation of the data on the display, is known by persons skilled in the art, and need not be further described herein.

As will be described herein, reference numeral 142 will be used to refer to the frame buffer generally, without distinguishing between the front frame buffer 142b and the back frame buffer 142a. Instead, it should be understood that the principals described herein, generally, apply to both frame buffers.

The frame buffer 142 generally comprises a segment of memory 152, where color/intensity data is stored, which corresponds to the color/intensity of pixels that are to be illuminated on the display 121. The memory segment 152 grows in size in proportion to the resolution of the display, as well as to the number of colors that are to be accommodated in the display. As is further known, additional memory segments may also be provided and associated with the frame buffer 142. For example, a memory segment 154 is typically provided in a computer graphics system to store depth information. This memory segment is typically referred to as a z-buffer. As is known, the rendering of a graphics scene involves the rendering of numerous primitives, many of which may overlie other primitives. Ultimately, only the primitive, which is closest to the viewer (ignoring the issue of transparent primitives), is ultimately visible when the display is rendered. The z-buffer 154 is typically utilized to store depth information for this purpose. That is, when writing a byte of data to the memory segment 152 of the frame buffer, the depth value associated with the current byte of data may be compared to the depth value (stored in the z-buffer 154) for the associated byte of data. The current byte of data is then written to the frame buffer to overwrite the previous byte of data, only if the depth value indicates that the current byte of data is closer to the viewer, than the previously stored byte of data. Again, the z-buffer 154 is well known in the art, and need not be described herein. Likewise, other circuitry and segments of circuitry associated with the frame buffer 142, which are well known in the art, are omitted and not described herein. For example, the handling and management of texture data, as well as the handling and management of transparent primitives, and other issues such as these are understood by persons skilled in the art, and need not be described herein. It should be appreciated, however, that these and other aspects that are conventional in the design and implementation of computer graphics systems may be readily implemented with the concepts in teachings of the present invention as described herein. In this regard, and as summarized above, the present invention is directed to a system and method for improving the manner in which the edges of adjacent primitives may be blended to provide a smoother image, visually presented on a graphics display 121. As will be described in further detail below, the manner in which this objective is achieved is by storing within the frame buffer 142 information relating to both the coverage area of an edge pixel, as well as the direction from the pixel center to the primitive edge. This data is stored in an additional memory segment 160.

In the preferred embodiment, for a given pixel, this information is stored in a single byte 162 of data. Preferably, this byte 162 of data is partitioned such that five bits are used to store the coverage information, while three bits are used to store direction data.

With few exceptions, the blending of color data between two adjacent primitives generally occurs along a single edge of a primitive (within a given pixel). Therefore, by providing an indication of the direction (from the center of the current pixel) to the edge of the primitive, then information regarding the pixel, which the current pixel color is to be blended with, can be preserved. By preserving this data, the blending operation may be delayed until the entire frame buffer memory has been filled. Utilizing the concepts and teachings of the present invention, the blend operation may be performed either: (1) after rendering the graphic data to the back frame buffer 142a, but before transferring the back frame buffer 142a to the front frame buffer 142b; or (2) the blending operation may be performed on the fly, between the front frame buffer 142b and the digital to analog converter 144. The latter of these two alternatives is preferred, insofar as the first option requires a read/modify/write operation of memory segment 152. Further, the blend operation of the present invention generally blends color information in accordance with the following equation:

Blend Color=Cov. Area×Source Color+(1−Cov. Area)×Adjacent Color, where the Source Color is the color of the current pixel, the Adjacent Color is the color for the pixel in the direction indicated by the direction information of byte 162, and the Cov. Area is the coverage area of the dominant primitive in the current pixel. It should be further appreciated that the foregoing blend operation is performed for each red, green and blue channel of a color display.

To provide a better working example, reference is again made to the illustration presented in FIGS. 1A–1D. Specifically, in reference to FIG. 1B, consider pixels 17, 18, 24, and 25. Pixels 17 and 25 lie wholly within the area of their respective primitives (cube 10 and 12, respectively), while pixels 18 and 24 both lie on the edge 16 of cube 12, and therefore both pixels will be blended. Initially, however, the color information for pixel 18 is stored in memory segment 152 as the color red, while the color information for pixel 24 is stored in memory segment 152 as blue, since the center points of each of these pixels lie in red cube 10 and blue cube 12, respectively. In addition, the byte 162 associated with each of these pixels will store the respective coverage and direction information for these pixels. For pixel 18, the coverage information will indicate that the pixel has approximately eighty percent coverage within the primitive of its center point, and the pixel that it is to be blended with is in the direction to the top of pixel 18. In similar fashion, the coverage information pixel 24 will indicate that it has approximately seventy percent coverage, and the pixel that it is to be blended with is in the direction below pixel 24. With regard to the direction information stored for pixel 18, it should be appreciated that the stored direction (i.e., the direction of the edge 16 from the center of the pixel 18 with either be toward the right, or toward the top of pixel 18). Although either direction may be chosen and still provide some level of anti-aliasing improvement, in the preferred embodiment, the slope of the edge 16 is considered. If the slope is less than forty-five degrees (with respect to the horizontal) then the direction will be taken as either toward the top or toward the bottom of the pixel. If the angle of the edge 16 is at a forty-five degree or steeper angle (with respect to the horizontal) then the direction will be chosen to be either left or right of the pixel. Therefore, pixel 18 will be blended by multiplying the eighty percent coverage area value times the coloration of its red, green, and blue color channels (individually) and adding to that value twenty percent of the red, green, and blue channel values of pixel 26.

Figure 5A:
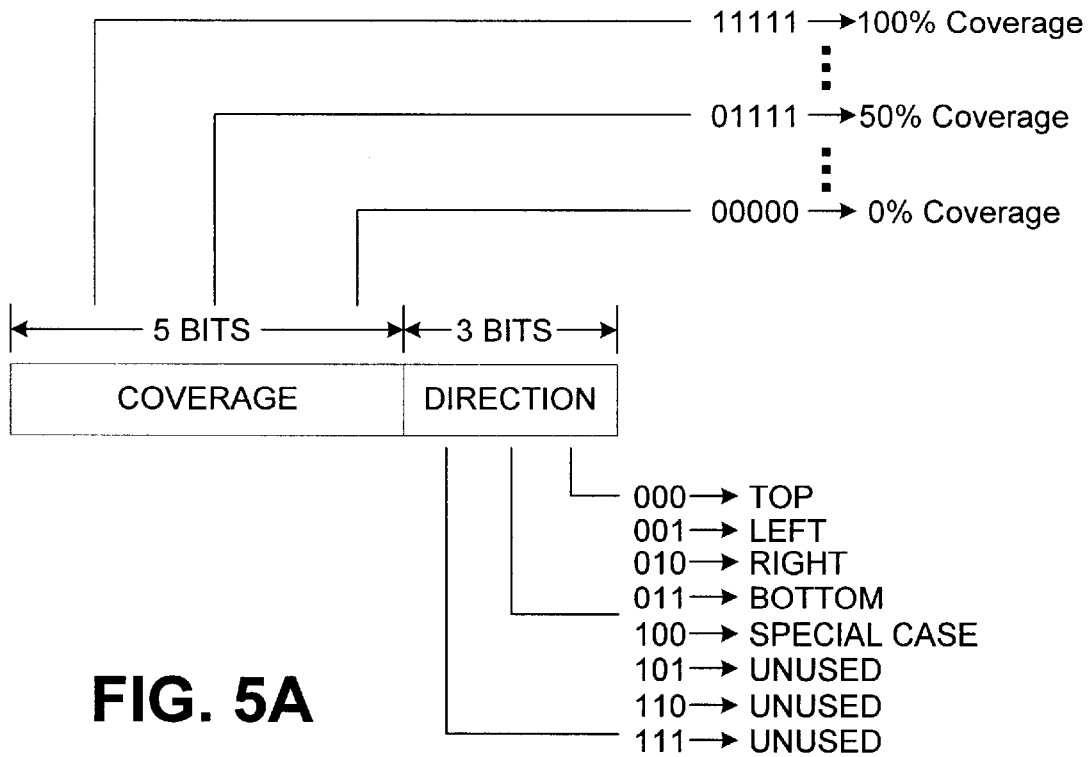
FIGS. 5A–5C illustrate alternative embodiments for structuring a memory byte of an additional memory illustrated in FIG. 4.
Figure 5B:
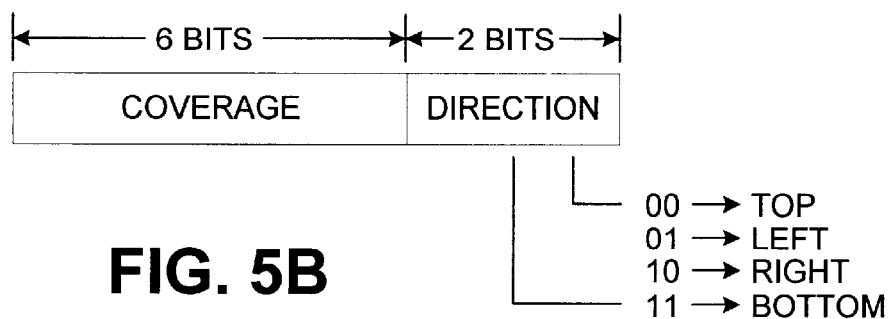
Figure 5C:
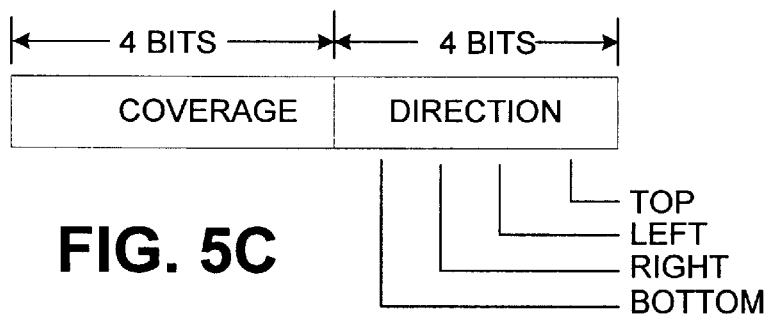

It will be appreciated that, consistent with the spirit and scope of the present invention, the additional byte 162 of information stored in the memory segment 160 associated with the frame buffer 142 may be partitioned in differing manners. In this regard, reference is made to FIGS. 5A through 5C which show differing alternatives that may be implemented, consistent with the present invention. Referring first to FIG. 5A, the partition of the byte 162 in accordance with the preferred embodiment of the present invention is shown. As previously mentioned, five bits are used to store coverage information for a given pixel. In this regard, a value of "00000" (binary) translates to a zero percent coverage of the pixel (a theoretical but unrealistic entry). Likewise, a binary value of "11111" corresponds to a one hundred percent coverage of the pixel (i.e., pixel is wholly within a primitive). All intermediate values translate to some intermediate coverage percentage, in proportion to the binary value.

The direction information of the last three bits is preferably encoded. In this regard, three bits provide up to eight pieces of information. A binary value of "000" may translate to a direction indicating that the pixel is to be blended with the pixel adjacent into the top of the current pixel. Likewise, values of "001", "010", and "011" may correspond to blend directions of left, right, and bottom, respectively. The additional states provided within this encoding allow for additional features to be readily accommodated by the system. For example, in the special case where two or more primitive edges intersect at a single pixel, a value of "100" may be encoded in the direction portion of the byte 162. This value may indicate that the current pixel is to be blended with the adjacent pixel colors in all four directions. Other, similar special case circumstances may be accommodated with the three additional encoded states.

In an alternative embodiment (FIG. 5B), the single byte 162 could be partitioned into six bits and two bits, where six bits are provided to encode the coverage area and two bits are encoded to provide direction information. In such an embodiment, all four directions could be accommodated, but additional, special case circumstances would have to be accommodated (if at all) utilizing other methods and mechanisms. Such an implementation would, however, provide greater resolution for the coverage area.

In yet a further embodiment (FIG. 5C), the single byte 162 may be partitioned down the middle into two groups of four bits each. In such an embodiment, coverage resolution is sacrificed, but simplicity in the encoding of blending direction is achieved. Specifically, in such an embodiment, each bit of the direction portion of the data byte may be used as a flag for a given direction. That is, one bit may correspond to the top direction, one bit may correspond to the left direction, one bit may correspond to the right direction, and one bit may correspond to the bottom direction. Each of these bits may be set or reset independently. If more than one primitive edge intersects a given pixel, then more than one of the four flags may be set simultaneously.

Figure 6:
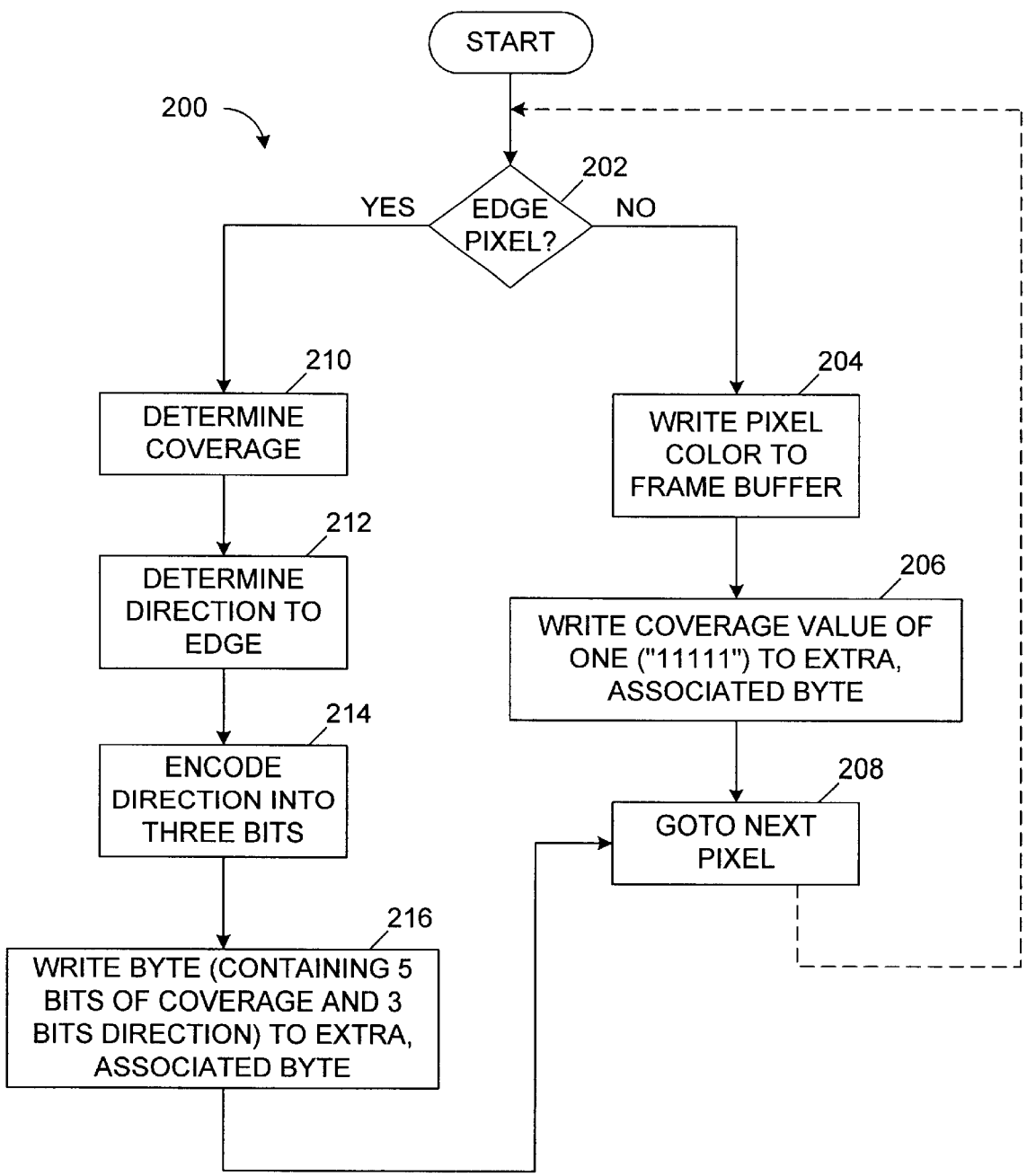
FIG. 6 is a flow chart illustrating the top-level functional operation of one embodiment of the present invention.

Having described the basic architecture of a graphics system in accordance with the present invention, reference is now made to FIG. 6, which is a flow chart 200 illustrating the top-level functional operation of a method for preserving color blending information, in accordance with one aspect of the present invention. In accordance with this method, a first step (step 202) may be to determine whether a 10 given pixel is an edge pixel (i.e., a pixel that borders a primitive edge). If not, then the pixel color may be directly written into the appropriate memory segment of the frame buffer (step 204). Thereafter, a coverage value of one (binary value "11111") may be written to the extra byte 162 of memory segment 160, corresponding to the current pixel (step 206). Thereafter, the method may proceed to the next pixel (step 208), and the foregoing steps may be repeated for each pixel of a rasterization. If a given pixel is determined to be an edge pixel, then the method may determine the coverage area for the current pixel (step 210). In this regard, the coverage area is the percentage of the pixel (containing the center point)

that lies within the edge of the primitive. This computation may be made in a variety of ways, consistent with the broader scope and content of the present invention. For example, U.S. Pat. No. 5,123,085 to Wells et al., which is incorporated by reference in its entirety, discloses a method and apparatus for rendering anti-alias polygons, and further discloses a method for determining the coverage of pixels which form edges of polygons. Other, similar examples are known in the art, and need not be described herein.

With regard to step 202, it will be appreciated that there are various methods presently known for determining whether a given pixel lies upon the edge of a primitive. For example, U.S. Pat. No. 5,812,139 to Morimoto, which is hereby incorporated by reference in its entirety, discloses one such method. Other, alternative methods are known, and need not be described herein in order to gain an understanding of the present invention.

After determining the coverage area, the method may determine the direction from the center point of the current pixel to the primitive edge (step 212). As previously mentioned, in the preferred embodiment this step is performed by assigning a direction of either left, right, or top, bottom, depending in part upon the slope of the primitive edge. If the primitive edge has a substantially horizontal slope (X major), then the direction will be set to either top or bottom, whereas if the primitive edge has a slope that is substantially vertical (Y major), then the direction will be set to either left or right. If the primitive edge is disposed at precisely a forty-five degree angle, then either left, right, or top, bottom blending directions may be chosen. Thereafter, the method of the preferred embodiment encodes the direction information into three bits (step 214). Thereafter, the coverage information, reduced to a five bit number and the direction information is written into the extra byte 162 associated with a given pixel within memory segment 160 of the frame buffer (step 216).

It will be appreciated from the foregoing discussion that various alternative configurations and embodiments may be practiced within the scope and spirit of the present invention. For example, treatment of primitives having transparent surfaces has not been described herein. However, there are various methods and apparatus that are known for handling transparent primitive surfaces. It will be appreciated that many of these techniques may be employed in connection with a system constructed in accordance with the present invention, and a detailed recitation of such systems need not be provided herein. In addition, it should be understood that various special case circumstances may be encountered that require special case consideration. Once such special case situation, in which aliasing arises, is known as inter-penetrations. This occurs in visual renderings where one object intersects (or penetrates) another object at a location other than the primitive edge. In these situations, the pixels at the boundary of penetration are not identified as edge pixels, and blending operations, in accordance with the present invention, are not performed. As a result, the jagged edges manifest and aliasing may occur. Therefore, special, separate treatment may be desired to handle inter-penetrations, in a system constructed in accordance with the present invention.

One manner of handling inter-penetrations may be implemented by determining and utilizing a slope of a Z value of a current pixel to detect an "effective" edge of a primitive. Specifically, this slope value may be utilized to identify internal pixels that may form an "effective" edge of the primitive since the depth value of the next (adjacent) pixel will indicate that the next pixel is occluded by the adjacent primitive. The coverage percentage can be estimated be determine where the point/slope of the current Z value and slope intersect the existing depth buffer value. This information is used to generate the A/A blend information, in accordance with the concepts of the present invention as described herein.

While the foregoing has given a basic description of image generation and primitive manipulation in a graphics acceleration, it should be appreciated that many areas have been touched upon only briefly, for purposes of illustrating the invention herein. A more complete and detailed understanding will be appreciated by those skilled in the art, and is accessible from readily-available sources. For example, the graphics accelerator of the presently preferred embodiment is designed for operation in systems that employ OpenGL, which is a well known graphics application program interface (API). Indeed, there are many references which provide a more detailed understanding of graphics generally, and OpenGL specifically. One such reference is entitled OpenGL Programing Guide, by OpenGL Architecture Review Board—Jackie Neider, Tom Davis, and Mason Woo, an Addison-Wesley Publishing Company, 1993, which is hereby incorporated by reference.

It should be further understood that the description provided herein is intended to convey an understanding of the present invention sufficient to enable persons skilled in the art to practice the invention. In this regard, a variety of implementation details have been omitted, which details can be readily appreciated from the description provided herein, without requiring an undue amount of experimentation. For example, it should be understood that when computing blend values for pixels, that the colors used in the blend operation will preferably be the originally stored color of the pixels, as opposed to intermediate colors generated through a prior blend operation. Therefore if a blend color is computed for a first pixel, and the next pixel to be blended is to be blended with the color of the first pixel, the original stored color of the first pixel is used, as opposed to its blended color value.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An anti-aliasing method comprising the steps of:
   determining whether a pixel is an edge pixel of a filled primitive;
   approximating a coverage area of the pixel, the coverage area being the area of the pixel interior to the primitive edge;
   determining a direction from the pixel center to an external edge of the primitive; and
   blending a first color of the primitive with a second color, the second color being a color of a pixel of a second primitive adjacent the external edge.

2. The method of claim 1, wherein the step of determining a direction from the pixel center includes determining whether the external edge is in a direction selected from the group consisting of: left of the pixel center, right of the pixel center, above the pixel center; and below the pixel center.

3. The method of claim 2, further including the step of encoding the direction from the pixel center to the external edge.

4. The method of claim 3, further including the step of storing the encoded direction and associating a storage location of the encoded value with the pixel.

5. The method of claim 1, wherein the step of blending a first color with a second color is performed after an entire graphic scene has been rasterized.

6. The method of claim 1, wherein the step of blending a first color with a second color more specifically includes blending the first color with a color of a second pixel, the second pixel being adjacent the pixel and in the direction.

7. The method of claim 1, wherein the step of blending a first color with a second color blends the first and second color in accordance with the following equation:

$$\text{Blended Color} = \alpha \cdot \text{First Color} + (1-\alpha) \cdot \text{Second Color},$$

where $\alpha$ is the coverage area.

8. An anti-aliasing method comprising the steps of:

evaluating a pixel to determine whether the pixel is on the edge of a filled primitive;

determining a coverage area of the pixel;

determining a direction from the pixel center to an external edge of the primitive; and blending a first color of the primitive with a second color, the second color being a color of a second primitive adjacent the pixel and in the determined direction.

* * * * *